Patented Aug. 23, 1949

2,480,010

UNITED STATES PATENT OFFICE 2,480,010

ANTIFUNGUS WRAPPER AND METHOD OF PEST CONTROL

Lawrence H. Flett, Scarsdale, N. Y., assignor to Allied Chemical & Dye Corporation, New York, N. Y., a corporation of New York No Drawing. Application March 27, 1947,
Serial No. 737,707

22 Claims. (Cl. 99—171)

This invention relates to new pest control agents for control of fungi and other organisms and more especially to agents for prevention and control of mold and mildew on foodstuffs such as bread and cheese and other perishable organic material.

As is well known, many organic materials which enter into commerce are subject to attack by fungi and other organisms. For example food products such as cheese, bread, fruit and vegetables are subject to rapid attack and growth of mold and mildew thereon, which adversely affects the quality, taste and marketability of the product, and textiles and other articles of apparel, such as cotton piece goods, sheets, woolens, leather goods and the like frequently become mildewed. Seeds are also highly susceptible to attack by many fungous and bacterial diseases. In fact, substantially any material derived from plants may be subject to attack by mildew, mold or other fungi, or other organisms.

In view of the above there is a great demand for compounds which will effectively protect organic material of the type described from fungous diseases. Many of the compounds suggested for use in this connection, e. g. mercury compounds, are toxic, so that use thereof, particularly in conjunction with foodstuffs, is highly disadvantageous. Other compounds suggested for use have the disadvantage of imparting objectionable odor or taste to the materials they are designed to preserve. Accordingly, the aforementioned demand remains unsatisfied.

It is an object of this invention to provide new agents for control of fungi and other organisms, which are especially suited for use in preserving foodstuffs.

I have found that dialkyl esters of α, β-dichlorosuccinic acid in which the alkyl groups contain not over 4 carbon atoms are effective agents for control of fungi and other organisms. The antimycotic action of these esters may be realized by placing the organic material to be protected in contact with, or closely adjacent to, the esters at room temperature so that the vapors which are slowly generated at such temperatures come in contact with the material; or the organic material may be exposed to hot gases containing vapors of one of the above esters in a suitable enclosure. The esters may also be employed for control of fungi on organic material infested therewith by application to the host in any conventional manner, as in the form of a dust, solution or dispersion.

In accordance with a preferred embodiment of my invention, wrapping material such as paper, waxed paper or cellophane, is impregnated or coated with a composition containing one or more of the above esters to produce a wrapper from which the antimycotic agent slowly vaporizes over a prolonged period of time and which is highly suitable for wrapping bread, cheese and other foodstuffs subject to mold attack; the antimycotic agent of this invention not only protects the foodstuff from mold, but when present in amounts of 5% or less by weight of the wrapping material, imparts no objectionable odor or taste to the food product.

The esters employed in accordance with my invention are the dialkyl esters of α, β-dichlorosuccinic acid in which the alkyl groups each contain not more than 4 carbon atoms. The preferred products employed in accordance with my invention are the lower dialkyl esters of α, β-dichlorosuccinic acid, e. g. dimethyl, diethyl, or methyl ethyl dichlorosuccinate. Use of the dimethyl or diethyl esters, as distinguished from the propyl or butyl esters, is preferred because of their higher volatility, but I have found the propyl and butyl esters to be useful if maintenance of an antimycotic atmosphere over a long period of time is desired. Mixtures of two or more of the above esters may also be employed. As is known, the above esters form stereoisomers; in accordance with the invention, mixtures of the stereoisomers are generally used, but, if desired, the individual isomers may be employed.

The esters described slowly vaporize at room temperature (about 25° C.) so that they may be employed as antimycotic agents in accordance with this invention by placing the organic material to be protected in contact with, or closely adjacent to, the esters at room temperature, for example by enclosing the material in a wrapper coated or impregnated with one or more of the esters. However, the above esters may also be employed in accordance with my invention in any manner in which fumigants are customarily utilized, e. g. by exposing the organic material to be protected to vapors of the esters in a suitable chamber by introduction of air at room temperature or higher saturated with the esters, or by permitting a suitable amount of the esters or solutions thereof to vaporize within a closed space, whereby the organic material is thoroughly impregnated with vapors of the ester and thereby protected against attack by fungi for a prolonged period of time.

In accordance with the preferred embodiment of my invention, wrapping material to be used for wrapping organic material such as foodstuffs, textiles and the like subject to fungus attack, is impregnated or coated with a composition containing one of the above described esters or a mixture thereof, preferably a lower dialkyl dichlorosuccinate. The wrapping material treated may be any suitable wrapper such, for example, as the various paper wrappers, waxed or other moisture-resistant paper, glassine, cellophane, Pliofilm (a rubber hydrochloride film), tinfoil or any other conventional wrapper. The ester may be applied to the wrapper in various ways; for example, by spraying a solution of the ester in ether or other volatile solvent thereon and permitting the solvent to evaporate, or by dipping the wrapper in a solution of the ester and evaporating the solvent. A particularly advantageous method of applying the ester to the wrapper involves incorporating one of the esters or a mixture thereof in material to be used for coating the wrapper to render it moisture- or grease-proof and/or heat-sealing; for example, a small percent of a lower dialkyl dichlorosuccinate may be admixed with paraffin or other wax compositions used for coating paper or cellophane to render them moisture-resistant and heat-sealing. Since the esters used in accordance with this invention have relatively high boiling points (233° C. or higher), they may be incorporated in coatings to be applied by the so-called "hot melt" technique as well as in coatings to be applied in solution. The amount of the ester incorporated with the wrapping material in accordance with this embodiment of my invention may vary but preferably should not be over 5% by weight of the wrapper, and may desirably comprise from 0.5% to 1% up to 2% by weight thereof; in cases wherein the ester is incorporated in a moisture-resistant coating on the wrapper, the amount of ester may desirably vary from 1% to 2%, by weight, of the solids in the coating. Use of larger amounts than above specified will be indicated in instances where it is desired to destroy all possible organisms, e. g. in the wrapping of fabrics. In those cases, however, where selective killing action is desired, such as in the wrapping of seeds where it is desired to kill seed borne diseases without killing the seed germ, use of such larger amounts may be disadvantageous, since it has been found that the above-described esters in pure form are highly destructive to all forms of life, both plant and animal, and if used at too high concentrations may adversely affect the organic materials which they are designed to protect. Wrappers impregnated or coated with compositions containing one or more of the esters as above described give off vapors of the ester over a prolonged period of time, so that they may be used to wrap foodstuffs such as bread, cheese, fruit and the like or other organic material subject to attack by mold or mildew in order to protect them from such attack; use of such wrappers, I have found, does not impart undesirable odor or taste to the wrapped material.

The esters above described may also be employed to control fungi by application to the fungus host of compositions containing one or more of the above esters in combination with a suitable carrier, which may or may not have fungicidal or insecticidal activity. Thus, the above esters may be applied in the form of a solution or suspension, or as a dust admixed with a suitable dust carrier such as talc, pyrophyllite, clay or the like; the above esters may be applied in combination with the usual spray supplements or with suitable wetting, emulsifying, sticking and spreading agents. They may also be used in combination with insecticides or other fungicides, if desired. When utilized in the manner above described, the composition applied to the fungus host preferably should not contain more 20%, by weight, of the esters of this invention, in order to avoid injury to the plant or other host.

The following examples are illustrative of my invention:

Example 1.—A solution of dimethyl dichlorosuccinate in ether was sprayed on a cellophane sheet and the ether evaporated to produce a sheet containing 2%, by weight, of the succinate. A box of fresh raspberries was wrapped in this sheet and the wrapped box then exposed to normal atmospheric conditions; for purposes of comparison another box of fresh raspberries was wrapped with untreated cellophane and exposed to the same conditions. The box wrapped with the untreated sheet developed mold within three days, whereas the box wrapped with the treated sheet developed no mold even after 20 days' exposure.

Example 2.—A solution of dimethyl dichlorosuccinate in ether was sprayed on a cellophane sheet and the ether evaporated to produce a sheet containing 1.8% by weight, of the succinate. A loaf of bread was then wrapped in this sheet and the wrapped bread exposed to normal atmospheric conditions; for the purpose of comparison a like loaf of bread was wrapped with untreated cellophane and exposed to the same conditions. The bread wrapped in the untreated sheet developed mold within three days, whereas the bread wrapped in the treated sheet was free of mold even after 25 days' exposure.

Example 3.—A paper wrapper was dipped in an alcohol solution of dimethyl dichlorosuccinate and the alcohol evaporated to produce a sheet containing 5%, of weight, of the succinate. A loaf of bread was wrapped in this wrapper and the wrapped bread was exposed to normal atmospheric conditions; for purposes of comparison a like loaf of bread was wrapped with an untreated paper wrapper and exposed to the same conditions. The bread wrapped in treated paper had developed no mold even after ten days' exposure.

Example 4.—A paper wrapper was dipped in an alcohol solution of dimethyl dichlorosuccinate and the alcohol evaporated to produce a sheet containing 5%, by weight, of the succinate. Cheese was wrapped in this wrapper and the wrapped cheese was exposed to normal atmospheric conditions; for purposes of comparison a like cheese was wrapped with an untreated paper wrapper and exposed to the same conditions. The cheese wrapped in the untreated paper developed mold after 5 days, whereas the cheese wrapped in treated paper had developed no mold even after ten days' exposure.

Example 5.—A cellophane sheet was coated with a mixture of paraffin wax and dimethyl dichlorosuccinate to produce a coated sheet containing 2% by weight of the succinate. Cream cheese was then wrapped in the coated sheet and exposed to normal atmospheric conditions; for purposes of comparison cream cheese was also wrapped in a cellophane wrapper coated with paraffin wax containing none of the succinate, and exposed to the same conditions. The cheese wrapped in the untreated paper quickly developed a strong yeasty taste and in less than a month showed a serious mildew condition. The cheese wrapped in the treated paper, however, was kept for six months without growth of mildew; in addition, the presence of the succinate in the wrapper could not be detected in the taste of the cheese, which remained fresh through the period.

*Example 6.*—A bread wrapper was prepared by coating cellophane with a mixture of paraffin wax and dimethyl dichlorosuccinate so as to produce a coated wrapper containing 1%, by weight, of the succinate. Freshly baked bread was then wrapped in this wrapper and exposed to normal atmospheric conditions; for purposes of comparison a similar loaf of bread was wrapped with the same type of wrapper coated with paraffin wax containing none of the succinate and exposed to the same conditions. The bread wrapped in the untreated paper developed mold rapidly, whereas the bread wrapped in the treated paper was maintained in a fresh condition with no mold development for a prolonged period of time.

*Example 7.*—Paper fruit wrappers were dipped in an ether solution containing dimethyl dichlorosuccinate, mineral oil and paraffin wax and the wrappers permitted to dry for five minutes to evaporate the ether; solutions were chosen so that four test papers were obtained, each containing .392% by weight paraffin wax, .392% by weight mineral oil and .049%, .098%, .196% and .392% by weight, respectively, of the succinate. Each of the four test papers was then used as individual wraps for tomatoes, six tomatoes being employed in each test; after wrapping, the tomatoes were exposed to normal atmospheric conditions. For purposes of comparison six tomatoes were also wrapped in untreated fruit wrappers. After four days one of the six tomatoes wrapped in the untreated paper was found to be moldy, and after 14 days an additional tomato wrapped in untreated paper was soft and moldy; by contrast, at the end of 14 days all the tomatoes wrapped with the treated paper were still sound.

*Example 8.*—A Pliofilm sheet and waxed paper were impregnated with a solution of dimethyl dichlorosuccinate in a petroleum ether so as to produce sheets containing 1%, by weight, of the succinate. Each of these sheets was then placed under the cover of a Petri dish containing a potato-dextrose-agar medium which had been seeded with spores of an *Aspergillus* species of fungus, the dishes being of a size such that there was a distance of 15 to 17 mm. between the impregnated sheet and the surface of the culture medium; for purposes of comparison a similar culture was grown in a Petri dish in which no treated sheet was inserted. After three days' incubation the control sample had developed a substantial growth of fungus, whereas there was no growth of fungus in the dishes in which the treated sheets had been placed.

Since certain changes may be made in the above process and in the articles above described without departing from the scope of the invention, it is intended that all matter contained in the above description shall be interpreted as illustrative and not in a limiting sense.

I claim:

1. A method of pest control which comprises subjecting organic material subject to infestation to the action of a dialkyl ester of $\alpha,\beta$-dichlorosuccinic acid in which the alkyl groups each contain not more than 4 carbon atoms.

2. A method of protecting organic material from fungus infestation which comprises contacting said material with vapors of a dialkyl ester of $\alpha,\beta$-dichlorosuccinic acid in which the alkyl groups each contain not more than 4 carbon atoms.

3. A method of protecting foodstuffs from fungus infestation which comprises contacting the foodstuff with vapors of a dialkyl ester of $\alpha,\beta$-dichlorosuccinic acid in which the alkyl groups each contain not more than 4 carbon atoms.

4. A method of protecting organic material from fungus infestation which comprises enclosing the organic material in a wrapper having incorporated therewith not more than 5%, by weight, of a dialkyl ester of $\alpha,\beta$-dichlorosuccinic acid in which the alkyl groups each contain not more than 4 carbon atoms, said ester slowly vaporizing and exerting an antimycotic action over a prolonged period of time.

5. A method of protecting organic material from fungus infestation which comprises contacting said organic material with vapors of a lower dialkyl ester of $\alpha,\beta$-dichlorosuccinic acid.

6. A method of protecting organic material from fungus infestation which comprises enclosing said organic material in a wrapper having incorporated therewith not more than 5%, by weight, of a lower dialkyl ester of $\alpha,\beta$-dichlorosuccinic acid, said ester slowly vaporizing and exerting an antimycotic action over a prolonged period of time.

7. A method of protecting organic material from fungus infestation which comprises enclosing said organic material in a wrapper having incorporated therewith not more than 5%, by weight, of the dimethyl ester of $\alpha,\beta$-dichlorosuccinic acid, said ester slowly vaporizing and exerting an antimycotic action over a prolonged period of time.

8. A method of preserving cheese foodstuffs which comprises enclosing the foodstuff in a wrapper having a small percent of dimethyl dichlorosuccinate incorporated therewith as an effective high boiling antimycotic agent.

9. A method of protecting foodstuffs from fungus infestation which comprises enclosing the foodstuff in a wrapper having incorporated therewith not more than 5%, by weight, of the dimethyl ester of $\alpha,\beta$-dichlorosuccinic acid, the ester slowly vaporizing and exerting an antimycotic action over a prolonged period of time.

10. A protective wrapper made of wrapping material having incorporated therewith as an effective high boiling antimycotic agent a small percent of a dialkyl ester of $\alpha,\beta$-dichlorosuccinic acid in which the alkyl groups each contain not more than 4 carbon atoms, said ester slowly vaporizing over a prolonged period of time.

11. An anti-fungus wrapper made of wrapping material having incorporated therewith as an effective, high boiling antimycotic agent a small percent of a lower dialkyl ester of $\alpha,\beta$-dichlorosuccinic acid, said ester slowly vaporizing over a prolonged period of time.

12. An anti-fungus wrapper made of wrapping material having incorporated therewith as an effective, high boiling antimycotic agent a small percent of the dimethyl ester of $\alpha,\beta$-dichlorosuccinic acid, said ester slowly vaporizing over a prolonged period of time.

13. An anti-fungus wrapper made of moisture-resistant coated paper, having as an effective high boiling anti-mycotic agent a small percent of a lower dialkyl dichloro succinate incorporated in the coating, said anti-mycotic agent slowly vaporizing over a prolonged period of time.

14. An anti-fungus wrapper made of moisture-resistant coated paper, coated with a heat-sealing coating composition, said composition having as an effective high boiling anti-mycotic agent a small percent of a lower dialkyl dichloro succinate incorporated in the coating, said anti-mycotic agent slowly vaporizing over a prolonged period of time.

15. An anti-fungus wrapper made of moisture-resistant coated paper, having about 1 to 2% of a lower dialkyl dichloro succinate incorporated in the coating.

16. An anti-fungus wrapper made of moisture-resistant coated paper, having about 1 to 2% of dimethyl dichloro succinate incorporated in the coating.

17. A protective wrapper made of wrapping material coated with a coating containing a small percent of a lower dialkyl ester of $\alpha,\beta$-dichlorosuccinic acid as an effective high boiling antimycotic agent, said ester vaporizing over a prolonged period of time.

18. An anti-fungus wrapper made of sheet wrapping material coated with a moisture-resistant coating composition, said wrapper having a small percent of dimethyl dichloro succinate incorporated therewith as an effective high boiling antimycotic agent.

19. An anti-fungus wrapper for foodstuffs, made of sheet wrapping material coated with a moisture-resistant wax-containing coating composition, said composition having a small percent of dimethyl dichloro succinate incorporated therein as an effective high boiling antimycotic agent.

20. An anti-fungus wrapper made of sheet wrapping material coated with a moisture-resistant, heat-sealing coating comprising essentially paraffin wax, said coating having from 0.5% to 2% of dimethyl dichloro succinate incorporated therein as an effective high boiling antimycotic agent.

21. An anti-fungus wrapper made of wrapping material having incorporated therewith as an effective, high boiling antimycotic agent not more than 5%, by weight, of dimethyl dichloro succinate.

22. An anti-fungus wrapper made of moisture-resistant coated sheet wrapping material having dimethyl dichloro succinate incorporated in the coating as an effective, high boiling antimyctic agent, the amount of dimethyl dichloro succinate being not more than 5%, by weight, of the wrapper.

LAWRENCE H. FLETT.

No references cited.